സ്

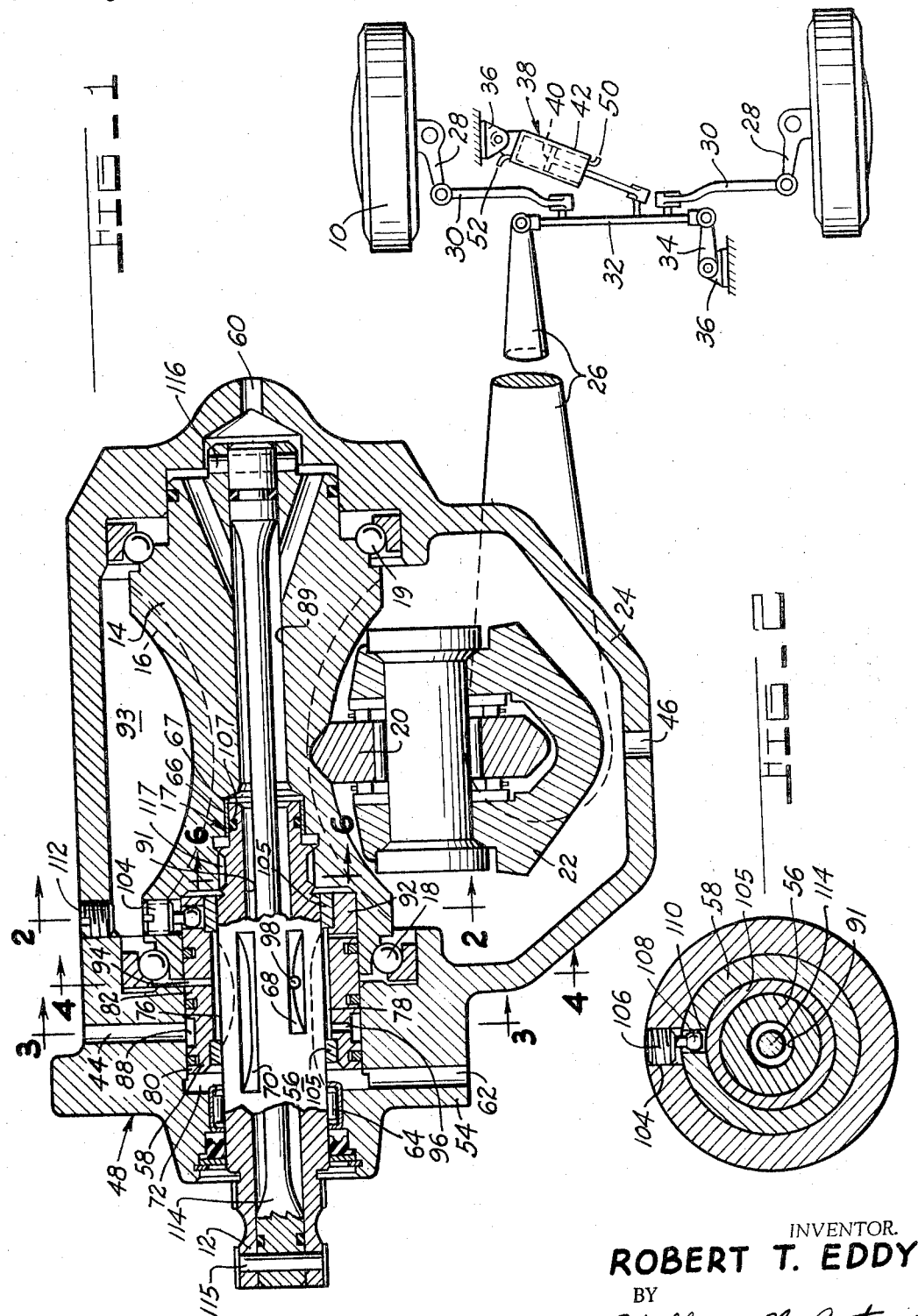

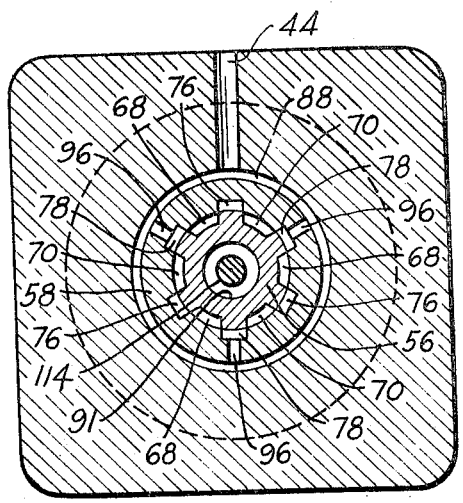
FIG_3
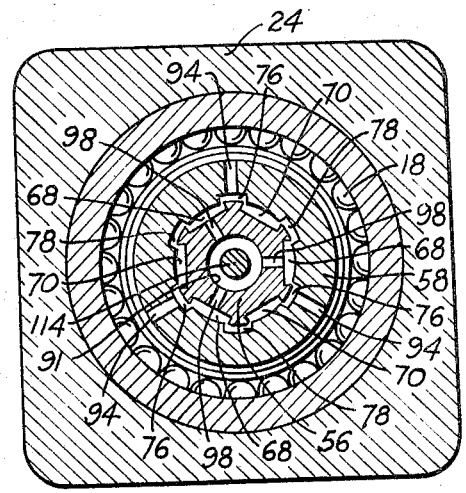
FIG_4

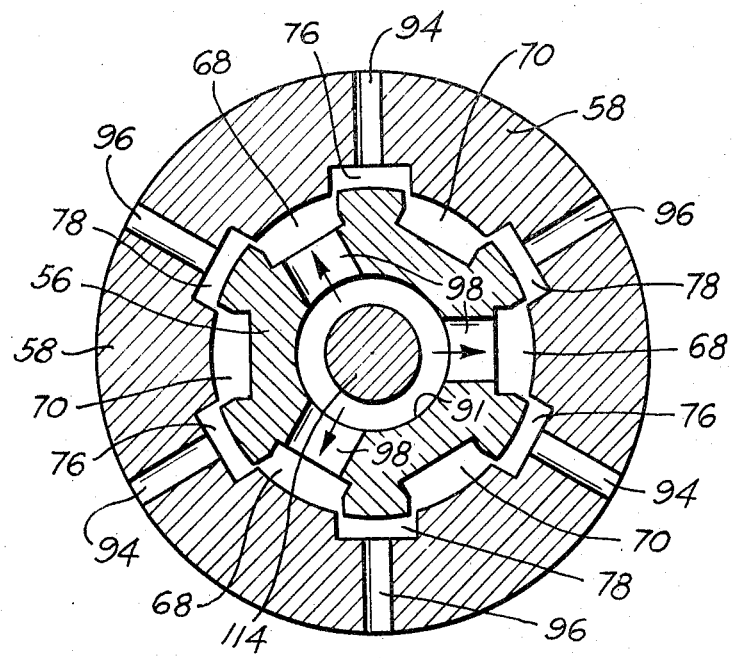
FIG_5
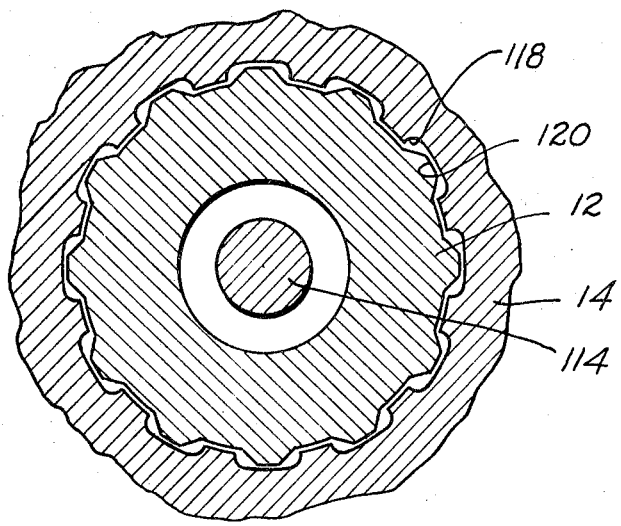
FIG_6
INVENTOR.
ROBERT T. EDDY.
BY
*William N. Antonis*
ATTORNEY.

United States Patent Office 3,296,939
Patented Jan. 10, 1967

3,296,939
POWER STEERING MECHANISM
Robert T. Eddy, South Bend, Ind., assignor to The Bendix Corporation, South Bend, Ind., a corporation of Delaware
Filed Aug. 31, 1964, Ser. No. 393,108
3 Claims. (Cl. 91—375)

This invention relates to power steering and more particularly to novel improvements in a compact rotary valve and worm gear power steering mechanism of the type disclosed in Arthur K. Brown's copending application Serial No. 225,442, filed September 24, 1962, now Patent No. 3,162,263, issued December 22, 1964.

An object of this invention is to provide a more compact rotary valve and worm gear power steering mechanism than has heretofore been possible.

Another object of this invention is to provide a power steering mechanism of the foregoing type which utilizes a less complicated valve sleeve and rotor.

A further object of this invention is to provide a power steering mechanism of the foregoing type wherein the damping ring between the valve sleeve and rotor is eliminated through use of a sealing O-ring between the valve rotor and worm which performs this function.

A still further object of this invention is to provide a power steering mechanism of the foregoing type wherein the axial length of the rotary valve is shortened by eliminating all but one of the annular grooves on the valve sleeve and by utilizing the bores of the worm and valve rotor for communicating the inlet port with the rotary valve.

The above and other objects and features of this invention will be apparent from the following description of the mechanism taken in connection with the accompanying drawings which form a part of this specification and in which:

FIGURE 1 is a view partially in section of a power steering mechanism constructed in accordance with the present invention which is shown in association with parts of a vehicle drawn schematically;

FIGURE 2 is a sectional view taken along line 2—2 of FIGURE 1;

FIGURE 3 is a sectional view taken along line 3—3 of FIGURE 1;

FIGURE 4 is a sectional view taken along line 4—4 of FIGURE 1;

FIGURE 5 is a composite sectional view which shows the passages of FIGURES 3 and 4 moved into the same plane for purposes of more clearly illustrating the flow paths within the valve; and FIGURE 6 is a sectional view taken along line 6—6 of FIGURE 1.

Referring to FIGURE 1, it will be seen that reference numeral 10 designates the front wheels of a vehicle to be steered by rotation of a steering shaft (not shown) which is suitably connected to input shaft 12. Operatively connected to the input shaft 12 is an hourglass worm 14 having a groove-type cam track 16 formed thereon and a step diameter bore 17 located within and at one end thereof which extends substantially to the bottom of the cam track without interfering therewith, said worm being held against axial displacement by radial thrust bearings 18 and 19 located at each end of the worm. A roller sector gear 20 is arranged to engage the cam track 16 of the worm and is carried by one end of a sector shaft 22 which is suitably journaled in gear housing 24. A pitman arm 26 is connected to the other end of sector shaft 22 and to the spindle arms 28 of the wheels 10 through a steering linkage assembly which includes tie-rods 30, a cross tie-rod 32 and an idler arm 34 suitably pivoted at one end of the vehicle frame 36.

The hydraulic system of the power steering mechanism includes a fluid motor 38 which may be connected between the cross tie-rod 32 and the vehicle frame 36 as shown in FIGURE 1. However, the fluid motor may be located at any other suitable position, for example, integral with the steering gear housing. A piston 40 divides cylinder 42 into opposed chambers constantly communicating respectively with cylinder ports 44 and 46 of rotary valve 48 via conduits 50 and 52.

The main components of the rotary valve 48 are the valve housing 54, the rotor 56 which is formed upon the input shaft 12 and the sleeve 58 which is located between the rotor and valve housing. Located in the housing 54 are inlet port 60, outlet port 62 and the two previously mentioned cylinder ports 44 and 46. It will be noted that the combination input shaft valve rotor has one end thereof which rotates on needle roller bearings 64 which are located between the input shaft 12 and the valve housing 54 while the other end thereof extends into the bore portion 67 of stepped diameter bore 17 and rotates on a bronze bearing 66 located between the input shaft and the worm 14. The rotor 56 contains six axially extending equally spaced slots formed on the outer periphery thereof, three of which are pressure slots and designated by the reference numeral 68 and the other three of which are return slots and are designated by the reference numeral 70. It will be noted that the return slots 70 are longer than the pressure slots 68 so that the return slots may communicate with the return chamber 72 located at one end of sleeve 58.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are two annular lands 80 and 82, and one annular groove 88. Since sleeve 58 extends into the bore portion 92 of stepped diameter bore 17, and since fluid pressure is communicated to the rotary valve via the bore 89 of the worm and bore 91 of the valve rotor, it is possible to eliminate the third and fourth annular lands and second and third annular grooves both of which are normally common to rotary valves of this general type, as typified by Davis Patent No. 1,947,973. In view of the arrangement shown it is possible to communicate steering gear cavity 93 with sleeve slots 76 via radially extending passages 94 without the necessity for utilizing an annular groove on the valve sleeve since radially extending passages 94 open directly into the steering gear cavity. On the other hand, radially extending passages 96, which are located within the sleeve, communicate sleeve slots 78 with annular groove 88. Radially extending passages 98, which are located in the input rotor member, communicate rotor slot 68 with bore 91 of the rotor member. Thus, it can be seen from the drawings, particularly FIGURES 1 and 5, that when the rotary valve 48, which is an open center valve, is in a neutral straight ahead position, flow will occur from inlet port 60 to outlet port 62 via bores 89 and 91 of the worm and valve rotor, radially extending rotor passages 98, axially extending rotor slots 68, axially extending sleeve slots 76 and 78, axially extending rotor slots 70 and return chamber 72. Cylinder port 44 communicates with sleeve slots 78 via radial sleeve passages 96 and annular groove 88, whereas cylinder port 46 communicates with sleeve slots 76 via radial passages 94 and steering gear cavity 93. Seals are also located in annular lands 80 and 82 to prevent leakage thereacross. These seals are glass filled Teflon endless sealing rings of rectangular section. The glass content increases pressure which can be tolerated prior to extrusion and only slightly increases friction compared to pure Teflon. The glass filling is 15% ground fibers by weight. Higher percentages of glass reduce the ability of this material to stretch in addition to increasing the coefficient of friction of material in contact with the metals. Stop off rings 105 seal off the axially extending sleeve slots 76 and 78 and also serve as bearings. In order to prevent possible vibrations within the power steering unit, an O-ring 107 is interposed between the valve rotor and worm. This O-ring serves the dual function of being a damping ring and a seal.

An eccentric screw 104, as shown in FIGURES 1 and 2, is used to key the valve sleeve 58 directly to the worm. The eccentric screw is threaded into the worm at one end 106 and has the other spherical end 108 extending into and in contact with the wall of a close fitting cylindrical hole 110, said hole being drilled into the end of valve sleeve 58. After removing the threaded plug 112, the eccentric screw 104 may be rotated by means of an Allen wrench so that the valve may be "trimmed." In other words, turning of the eccentric screw causes rotation of the sleeve with respect to the worm. Since index is held between the valve rotor 56 and worm 16 by means of torsion bar 114 which is pinned at one end 115 to the input rotor and at the other end 116 to the worm, this adjustment also rotates the sleeve with respect to the rotor thereby permitting balancing of the pressures on opposite sides of the piston 40.

The three equally spaced flow paths previously described give balanced forces within the valve due to the fluid flow, thereby eliminating any stickiness due to hydraulic unbalance. Upon rotation of the steering wheel, the valve rotor 56 is rotated relative to the valve sleeve 58 as a result of deflection of the torsion rod 114 which connects the valve rotor and the steering gear worm. This movement is in proportion to input torque. As can more clearly be seen by reference to FIGURE 5, relative rotation between valve rotor 56 and valve sleeve 58 will cause one of the cylinder ports 44 or 46 to communicate with the inlet ports 60 and the other cylinder port to communicate with the outlet port 62. This will create a differential pressure across piston 40 and will result in power assisted steering.

It will be seen from FIGURES 1 and 6 that a mechanical drive through pick-up connection 117 is provided between the combination input rotor 56 and the worm 14 which will result in a direct mechanical drive between the input shaft and the worm in the event of power failure. At all other times this connection will permit limited relative rotary motion between the input shaft and the worm. More specifically, the mechanical drive through connection includes an internal spline 118 formed in the stepped diameter bore 17 of the worm and an internal loose fitting spline 120 on the end of the input shaft extending in to the stepped diameter bore. It will be noted that sufficient clearance is provided between the internal and external splines for normal valve movement. If, however, power failure occurs, the driver will deflect the torsion rod until contact is made between the splines. Input torque is then transmitted exactly as in a manual steering system. The torsion rod 114 which connects the valve rotor and worm provides mechanical "feel" without preventing the necessary angular movement required between the sleeve and rotor for valve operation.

The several practical advantages which flow from my novel inventive combination are believed to be obvious from the above description and other advantages may suggest themselves to those who are familiar with the art to which the invention relates. Having thus described the various features of the invention what I claim as new and desire to secure by Letters Patent is:

1. In a power steering mechanism including an input member having a bore therein, an output member, and a fluid motor operatively connected to said output member for applying power thereto, the combination of a housing having a valve bore and a steering gear cavity therein, an inlet, outlet, and two cylinder ports located in said housing, an hourglass worm having a cam track thereon and a stepped diameter bore located within and at one end thereof which extends substantially to the bottom of the cam track without interfering therewith, a follower operatively connected to said output member and engaging said cam track, said hourglass worm and follower being located in the steering gear cavity of said housing, a pair of relatively rotatable nested tubular elements through which fluids flow to and from said motor is controlled, said tubular elements being located in the valve bore of said housing, one of said elements being said input member and the other of said elements being a sleeve member connected to said hourglass worm and located between said input member and housing, said tubular elements each having one end thereof extending into and located substantially within said stepped diameter bore of said hourglass worm, means for opposing rotation of said input member, only one annular groove formed on the outer periphery of said sleeve member and defined by two annular lands each having sealing means in contact with said valve bore, passage means for communicating said annular groove with one of said cylinder ports, a plurality of axially extending slots formed on the inner periphery of said sleeve member and the outer periphery of said input member, said slots being in overlapping relation when said input member and sleeve member are in a neutral position, inlet passage means located in said input member for communicating half of the slots in said input member with said inlet port via the bores in said input member and worm, outlet passage means located at the end of the sleeve member furthest removed from said worm for communicating the other half of the slots in said input member with said outlet port, first cylinder passage means located in said sleeve member for communicating half of the slots in said sleeve member with one of the cylinder ports via said annular groove, second cylinder passage means located in said sleeve member for communicating the other half of said slots in said sleeve member with the other of said cylinder ports via said steering gear cavity, and mechanical drive through pickup means located on said one end of said input member and in said stepped diameter bore of said hourglass worm for permitting limited relative rotary motion between said input member and said worm.

2. A power steering mechanism, as defined in claim 1, wherein means are located between said input member and the stepped diameter bore of said hourglass worm for providing a seal and preventing vibrations therebetween.

3. A power steering mechanism, as defined in claim 1, wherein said means for opposing rotation of said input member includes a torsion bar located in and extending through the bores of said input member and worm, said torsion bar having one end thereof rigidly connected to said input member and the other end thereof rigidly connected to said worm.

References Cited by the Examiner
UNITED STATES PATENTS

| | | | |
|---|---|---|---|
| 3,138,069 | 6/1964 | Bishop | 91—375 |
| 3,145,626 | 8/1964 | Vickers et al. | 91—375 |

MARTIN P. SCHWADRON, *Primary Examiner.*

PAUL E. MASLOUSKY, *Examiner.*